United States Patent Office 3,549,348
Patented Dec. 22, 1970

3,549,348
USE OF N-ARYL-N-SUBSTITUTED AMINO PHTHALAMIDES AS HERBICIDES
Arthur H. Gevirtz, Orange, N.J., Ronald B. Ames, Naugatuck, and Allen E. Smith, Bethany, Conn., assignors to Uniroyal Inc., New York, N.Y., a corporation of New Jersey
No Drawing. Original application Oct. 20, 1967, Ser. No. 676,695, now Patent No. 3,502,685, dated Mar. 24, 1970. Divided and this application Aug. 5, 1969, Ser. No. 847,706
Int. Cl. A01n 9/20
U.S. Cl. 71—88                    16 Claims

ABSTRACT OF THE DISCLOSURE

Chemical compounds having the general formula

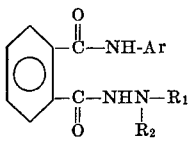

where Ar is a naphthyl or chlorosubstituted phenyl group; and $R_1$ and $R_2$ are hydrogen or a lower alkyl group or compositely form a heterocyclic ring, or, when $R_1$ is hydrogen, $R_2$ is phenyl, naphthyl, or a chlorosubstituted derivative thereof are used as herbicides.

RELATION TO OTHER APPLICATION

This application is a division of our copending application Ser. No. 676,695 filed Oct. 20, 1967, now U.S. Pat. No. 3,502,685.

This invention relates to N-aryl-N'-substituted amino phthalamides and their use as herbicides, particularly, as pre-emergent herbicides.

Controlling weeds in certain agricultural crops without injuring the crop is a unique problem. Many herbicides will control weeds without injury only under optimum conditions. Herbicides applied over a large geographical area seldom have optimum conditions to work. Under adverse conditions, such as heavy rainfalls or very dry soil conditions, pre-emergent herbicides will give erratic performance. N-1-naphthyl phthalamic acid, a well known pre-emergent herbicide, performs well under optimum conditions in that it controls weeds without injuring the crop. Under wet or heavy rainfall conditions, N-1-naphthyl phthalamic acid will move downward through the soil into the germinating crop seed zone and cause considerable injury. The present invention is unique in that, by converting the carboxyl group of N-1-naphthyl phthalamic acid to a hydrazide group, leaching is virtually eliminated. This is a desirable discovery for two reasons: firstly, the chemical stays in the germinating weed seed zone, facilitating weed control; and secondly, the chemical is less likely to injure the crop seed germination since this zone is below the weed seed zone. To initiate this activity, phthalamides may be applied to the soil at, before or after crop emergence and before weed emergence.

The compounds of the present invention may be represented by the general formula:

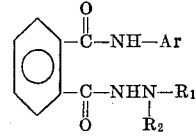

where Ar is naphthyl, particularly α-naphthyl, the chloro-substituted phenyls, such as di- and trichlorophenyl, and $R_1$ and $R_2$ may be hydrogen or lower alkyl having 1 to 5 carbon atoms or compositely form a non-aromatic heterocycle, or if $R_1$ is hydrogen, $R_2$ is phenyl or naphthyl or chlorosubstituted derivatives thereof. Examples of $R_1$ and $R_2$ are methyl, isopropyl, butyl, —$(CH_2CH_2)_2O$—, tetramethylene, pentamethylene, or hexamethylene.

The aforesaid compounds are prepared by reaction of N-arylphthalimides with 1 to 2 equivalents of the desired hydrazine according to procedures known to those experienced in the art. The reaction may be carried out using an inert solvent such as water, methanol, acetonitrile as a reaction medium. The reaction can be carried out at room or reflux temperatures depending upon the nature of the hydrazine.

The following example illustrates the preparation of the compounds of the invention:

EXAMPLE I

N-(1-naphthyl)-N'-(amino)phthalamide 14 g. (0.057) N-(1-naphthyl)phthalimide M.P. 184–185° were added to 300 ml. of acetonitrile and 28 g. (0.09 mole) of anhydrous hydrazine were added with stirring. Within 2 minutes new solid formation occurred. The mixture was stirred one hour to insure complete reaction. Upon filtration 14.9 g. (96%) of white solid M.P. 140–141° (dec.) were obtained. An infrared spectrum showed the presence of moderate N-H bands at 3.08, 3.13 and 3.21μ and strong bands at 6.11, 6.22, 6.32μ compatible with the desired compound.

A representative list of compounds prepared by this method and representative of the present invention are described in Table I.

TABLE I

| Ar | $R_1$ | $R_2$ | ° M.P. | Empirical formula | Calculated, percent | | | Found, percent | | |
|---|---|---|---|---|---|---|---|---|---|---|
| | | | | | C | H | N | C | H | N |
| 2,3-dichlorophenyl | Methyl | Methyl | Dec. >100 | | | | | | | |
| 1-naphthyl | do | do | 193–5 dec | | | | | | | |
| Do | Hydrogen | Hydrogen | 140–1 dec | $C_{18}H_{15}N_3O_2$ | 70.81 | 4.95 | 13.76 | 69.86 | 4.93 | 14.3 |
| Do | do | Phenyl | 214–5 dec | $C_{27}H_{21}H^3O^3$ | 75.57 | 5.02 | 11.02 | 76.45 | 4.73 | 11.30 |
| Do | Pentamethylene | | 205–6 dec | $C_{23}H_{23}N_3O$ | 73.97 | 6.21 | 11.25 | 73.60 | 6.22 | 11.82 |
| Do | —$(CH_2CH_2)_2$—O— | | 217–8 dec | $C_{24}H_{19}N_3O_2$ | 70.38 | 5.64 | 11.19 | 70.58 | 5.65 | 11.57 |
| 3,5-dichlorophenyl | Hydrogen | Hydrogen | 132–3 dec | | | | | | | |

The chemicals of the present invention may be applied to soil at, before or after crop emergence and before weed emergence. The chemicals may be applied to soil in various forms as explained below.

The chemical may be impregnated or granular organic and inorganic carriers such as corncobs, activated carbon, attapulgite clay, mica and other types of granular carriers known in the art. They may also be pelletized as described by Gallaway Pat. No. 3,056,723 or by Polon Pat. No. 3,192,290. If desired, the chemicals may be mixed with a powdered solid carrier, together with a surface active dispersing agent, so that a wettable powder may be obtained which may be applied directly, or which may be shaken up with water to make an aqueous dispersion for application in that form. The chemicals may be dissolved in aliphatic and aromatic hydrocarbons, and the solution of the chemical dispersed in water with the aid of a surface-active dispersing agent to give a sprayable aqueous dispersion. Such surface-active dispersing agents may be anionic, nonionic or cationic surface active agents. Such surface-active agents are well known and reference is made to Hoffman et al., U.S. Pat. No. 2,614,916, columns 2 to 4, for detailed examples of the same.

The chemicals, in the forms listed above, may be applied (1) to the surface and (2) to soil surface and incorporated to a depth of ½ to 2".

The chemicals may be applied to the soil at rates of 1 to 40 pounds/acre, preferably, up to 20 pounds/acre.

To illustrate more fully the herbicidal use of the compounds of the instant invention attention is directed to the following example:

EXAMPLE II

One hundred and fifty mg. of each chemical were ground and blended with 75 mg. of a wettable powder containing 4% Triton X120 (alkylaryl polyether alcohol OPE9–10), 4% Daxad 11 (alkylnaphtholene sodium sulfonate) and 92% Dixie clay (inert). This mixture was made up to 300 ml. with $H_2O$, giving a 500 p.p.m. solution. Forty and eightly ml. of the 500 p.p.m. solution were made to 160 ml. with $H_2O$ to give two solutions containing 125 and 250 p.p.m. solution respectively. Eighty mls. of each concentration were drenched on a 150 mm. pot which contained a mixture of four broadleaf weeds, namely pigweed—*Amaranthus retroflexus*, purslane—*Portulaca oleracea*, lambsquarters—*Chenopodium album* and oxeye daisy—*Chrysanthemum leucanthemum*. Also in the pot were three grass species, namely crabgrass—*Digitaria sanguinalis*, barnyard grass—*Echinochlea crusgalli* and giant foxtail—*Setaria faberii*. Eighty ml. of the remaining concentrations were applied as replications. Eighty ml. of the three concentrations, 125, 250 and 500, as applied are equal to 5, 10 and 20 pounds per acre. Pots were subirrigated and scored 14 days later. Table II illustrates the herbicidal activity of the compounds of the invention:

TABLE II

| | Percent control at— | | |
|---|---|---|---|
| | 20 lbs./A. | 10 lb./A. | 5 lbs./A. |
| N-(1-naphthyl)-N'-(dimethylamino)-phthalamide | 92 | 95 | 92 |
| N-(1-naphthyl)-N'-(amino)-phthalamide | 92 | 87 | 85 |
| N-(1-naphthyl)-N'-(anilino)-phthalamide | 96 | 89 | 91 |
| N-(1-naphthyl)-N'-(piperidino)-phthalamide | 73 | 80 | 50 |
| N-(1-naphthyl)-N'-(morpholino)-phthalamide | 94 | 84 | 60 |
| N-(3,5-dichlorophenyl)-N'-(amino)]phthalamide | 59 | 33 | 30 |

Injury to the soybean plants was measured as percent stunting as compared to control as well as percent occurrence of negative geotropic type injury. Results are given in Table III:

TABLE III

| | Percent control at— | | |
|---|---|---|---|
| | 20 lbs./A. | 10 lbs./A. | 5 lbs./A. |
| N-(1-naphthyl)-N'-(dimethylamino)phthalamide | 35 | 5 | 5 |
| N-(1-naphthyl)-N'-(amino)phthalamide | 0 | 0 | 0 |
| N-(2,3-dichlorophenyl)-N'-(dimethylamino)-phthalamide | 15 | 0 | 0 |
| N-(1-naphthyl)phthalamic acid | 90 | 78 | 70 |

The above data clearly show that the compounds of the invention are far less injurious to plants than the most closely related compounds of the prior art, viz., the N-(l-naphthyl phthalamic acid listed last in Table III.

Having thus described our invention, what we claim and desire to protect by Letters Patent is:

1. A herbicidal composition which comprises a herbicidally effective amount of a compound having the formula:

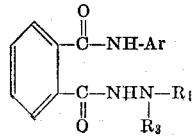

where Ar is naphthyl, dichlorophenyl or trichlorophenyl and $R_1$ and $R_2$ are hydrogen or lower alkyl having from 1 to 5 carbon atoms or compositely form, with the N atom to which they are bonded, a piperidino or a morpholino ring or, when $R_1$ is hydrogen, $R_2$ is phenyl; and a surface active agent.

2. The herbicidal composition of claim 1 wherein Ar is α-naphthyl.

3. The herbicidal composition of claim 1 wherein the compound is N-(1-naphthyl)-N'-(amino)phthalamide.

4. The herbicidal composition of claim 1 wherein the compound is N-(2,3-dichlorophenyl)-N'-(dimethylamino)phthalamide.

5. The herbicidal composition of claim 1 wherein the compound is N-(1-naphthyl)-N'-(dimethylamino)phthalamide.

6. The herbicidal composition of claim 1 wherein the compound is N-(1-naphthyl)-N'-(anilino)-phthalamide.

7. The herbicidal composition of claim 1 wherein the compound is N-(1-naphthyl) - N' - (piperidino) - phthalamide.

8. A method of controlling weeds which comprises treating the soil with a herbicidally effective amount of from 1 to 40 pounds per acre of a compound having the formula:

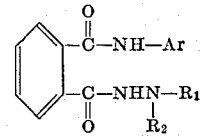

where Ar is naphthyl, dichlorophenyl or trichlorophenyl and $R_1$ and $R_2$ are hydrogen or lower alkyl having from 1 to 5 carbon atoms or compositely form, with the N atom to which they are bonded, a piperidino or a morpholino ring or, when $R_1$ is hydrogen, $R_2$ is phenyl.

9. The method of controlling weeds of claim 8 wherein Ar is α-naphthyl.

10. The method of controlling weeds of claim 8 wherein the compound is N-(1-naphthyl)-N'-(amino)phthalamide.

11. The method of controlling weeds of claim 8 wherein the compound is N-(2,3-dichlorophenyl)-N'-(dimethylamino)phthalamide.

12. The method of controlling weeds of claim 8 wherein the compound is N-(1-naphthyl)-N'-(dimethylamino)phthalamide.

13. The method of controlling weeds of claim 8 wherein the compound is N-(1-naphthyl)-N'-(anilino)-phthalamide.

14. The method of controlling weeds of claim 8 wherein the compound is N-(1-naphthyl)N'-(piperidino)-phthalamide.

15. The herbicidal composition of claim 1 wherein the compound is N-(1-naphthyl)-N'-(morpholino)-phthalamide.

16. The method of controlling weeds of claim 8 wherein the compound is N-(1-naphthyl)-N'-(morpholino)-phthalamide.

References Cited

UNITED STATES PATENTS 3,318,677  5/1967  Hogeman et al. _____ 71—94X
3,334,991  8/1967  Hogeman et al. _____ 71—94X JAMES O. THOMAS, JR., Primary Examiner U.S. Cl. X.R.

71—94, 118